United States Patent [19]
Nelson

[11] 3,748,023
[45] July 24, 1973

[54] PORTABLE INFORMATION RETRIEVER

[76] Inventor: Gary K. Nelson, 1330 Finley Rd., Lombard, Ill. 60148

[22] Filed: Apr. 10, 1972

[21] Appl. No.: 242,710

[52] U.S. Cl. .................................. 350/241, 40/343
[51] Int. Cl. .......................................... G02b 27/02
[58] Field of Search .................... 350/241, 293, 238, 350/247; 40/342, 343, 347

[56] References Cited

UNITED STATES PATENTS

| | | | |
|---|---|---|---|
| 3,522,672 | 8/1970 | Hinds | 350/241 |
| 3,328,889 | 7/1967 | Malakowski | 350/241 |
| 3,180,207 | 4/1965 | Herrmann | 350/293 |

*Primary Examiner*—David Schonberg
*Assistant Examiner*—Michael J. Tokar
*Attorney*—Charles W. Rummler et al.

[57] ABSTRACT

A low cost, page-size viewing receiver without optical power having relatively inverted opposite side viewing configurations which is capable of being held and operated by one hand, which provides for storage of a large amount of information on a scroll or tape therein, and which provides for quick retrievability of said information therefrom by searcher finger control of a reversible indexing motor drive of the scroll to bring the information into a viewing area from whence it can be easily read involving the use of the same fingers of the operator regardless of the side of the viewing device being observed.

4 Claims, 5 Drawing Figures

PORTABLE INFORMATION RETRIEVER

BACKGROUND OF THE INVENTION

The present invention relates generally to visual tape reading devices and more particularly to a portable device for conveniently and quickly selecting and viewing printed information from a large amount of information stored on a page-size tape such as an abridged dictionary or the like.

For some time there has been a need for a small, lightweight, single hand-held and hand-operated viewing device having a large page-sized information storage capacity which makes desired information quickly and conveniently retrievable therefrom. All known page-size reading devices for this purpose are relatively complicated, nonportable and expensive.

SUMMARY OF THE INVENTION

The indexing viewer or information retriever of this invention is a hand-held and hand-operated device containing two spools around which a page-sized scroll tape is wound and between which the tape is run thrrough an enclosed viewing area. The tape is wound in the same rotational direction around both spools so that the operation of the viewing device is the same when it is held in the same hand of the operator regardless of which side of the device is being observed. The tape stores information, for example, constituting an abridged dictionary, and the spools are motor driven and reversible so that information wound on either spool can be brought into the viewing area for retrieving the information on the tape. The motor is powered by self-contained batteries and is controlled by reversing switch means so that the operator can run the tape in either direction to the desired point where the information sought appears in the viewing area. Since the viewer inverse relation on opposite sides, pushbutton switches are disposed on both sides thereof whereby the forwarding and reversing operations of the tape by interchange of the drive involves the use of the same fingers of the operator regardless of which side of the viewing device is being observed. The motor, battery, switch and drive mechanism are all housed within the handle of the device. The viewing area comprises a relatively thin transparent housing providing a channel through which the tape passes, the channel having a width and height approximating that of the page-size of a small open book. The information is printed on both sides of the tape in multi-columnar form for visual readout from the opposite sides thereof.

BRIEF DESCRIPTION OF THE DRAWINGS

A specific embodiment of the invention is illustrated by the drawings, in which.

DESCRIPTION OF THE PREFERRED EMBODIMENT

Figure 1:
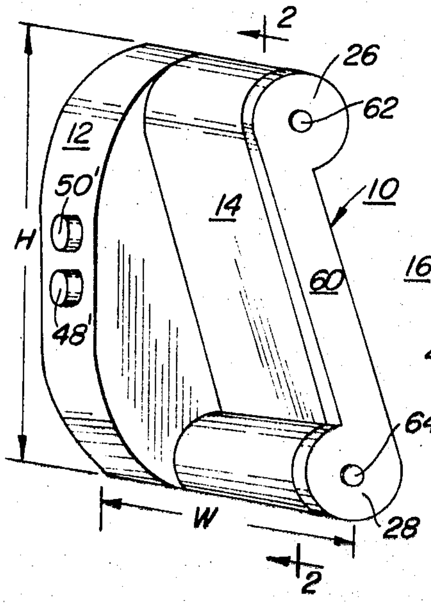
FIG. 1 is a perspective view showing the portable information retrieving viewer.
Figure 2:
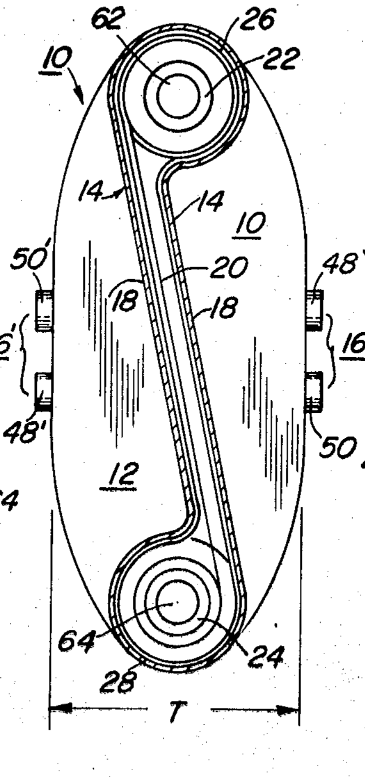
FIG. 2 is a cross section of the viewer along line 2—2 of FIG. 1.

Referring to the drawings, particularly FIG. 1, the portable information retrieving viewer comprises a main body 10 having a width W from end to end of about 6 inches and a height H from top to bottom of about 4 inches and an overall thickness T from front to back of about 2 inches. A hollow handle portion 12 is connected to one end of the body 10 for manually holding the device. Front and back side panels 14 lie on opposite sides of the thickness T of the body 10, as indicated in FIG. 2, and, as shown, the viewing area 18 is a transparent portion of the panel 14 on each side of the body 10 extending between the spool housings 26–28. Reversing switch means 16 is located on each side of the handle 12 corresponding to the sides of the body 10 for controlling the indexing of the scroll or tape 20 from either side of the body 10. The spaced side panels 14 make up the two sides of the viewer and provide the transparent viewing area through which the tape 20 is seen. The tape 20, which carries the printed information, passes in the space or channel between the transparent side panels 14, as shown in FIG. 2, for the readout of the information stored thereon.

Figures 4, 5:
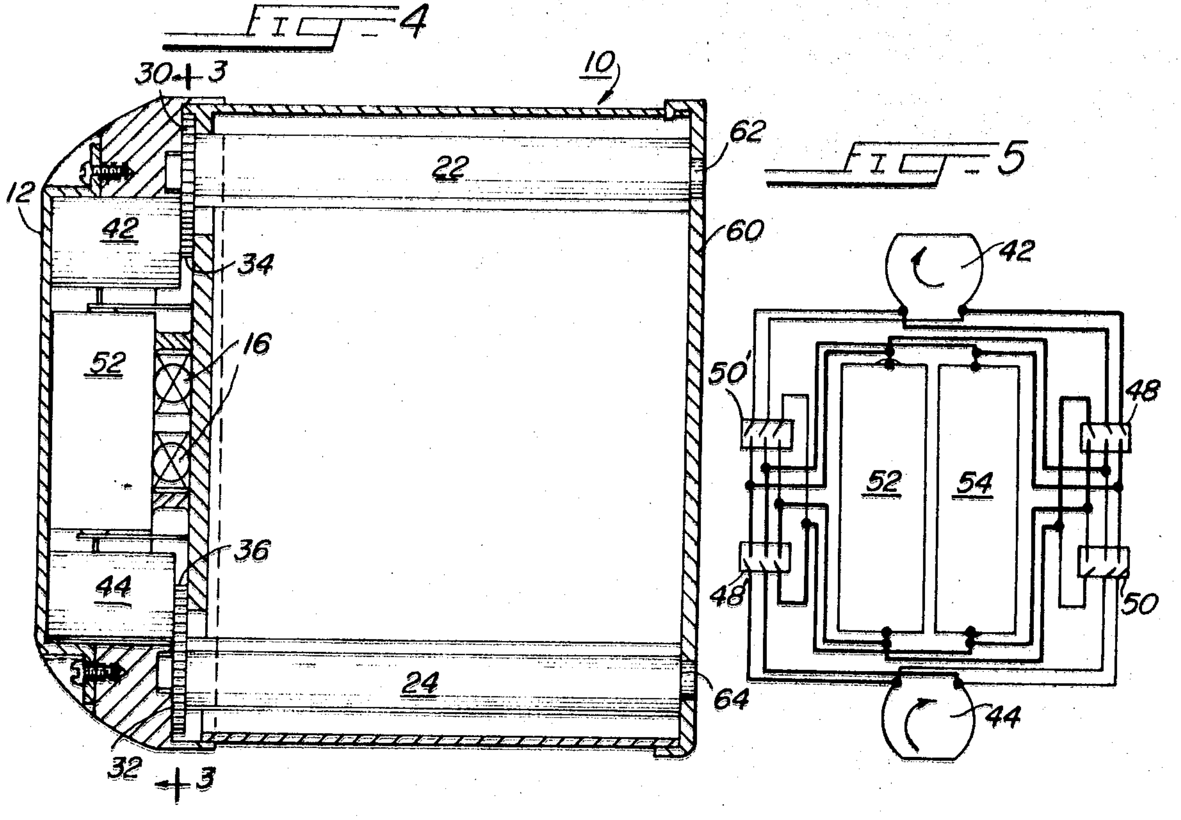
FIG. 4 is a cross section of the viewer along line 4—4 of FIG. 3.
FIG. 5 is a schematic illustration of an electrical circuit for operating the viewer.

First and second spools 22 and 24 which extend the width of the body 10, along the top and bottom of the height H, are journaled in the spool housing s 26 and 28, respectively, as shown in FIG. 4, and the tape 20 is wound about the spools 22 and 24 in the same direction on each but from opposite sides so that when it is wound in one direction about the spool 24, it unwinds in the opposite direction from the spool 22, and vice versa. The spool housings or casings 26 and 28, which extend the width of the body 10 along the top and bottom thereof and are integrally connected with the flat side panels 14, encase or house the spools 22 and 24, respectively.

Figure 3:
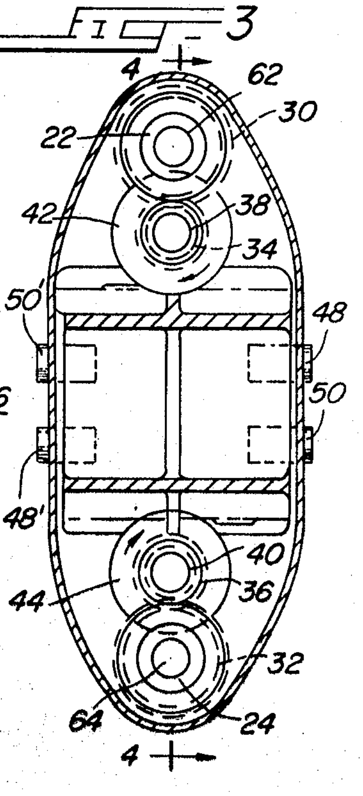
FIG. 3 is a cross section of the viewer along line 3—3 of FIG. 4.

In the form of the device shown, which is designed to be held in the user's left hand, spur gears 30 and 32 are fixedly mounted to the journaled ends of the respective spools adjacent to the handle 12, as shown in FIG. 4, and pinion gears 34 and 36 engage the spur gears 30 and 32 to drive them. Motor shafts 38 and 40, as shown in FIG. 3, fixedly mount the pinion gears 34 and 36, respectively, and motors 42 and 44 mounted in the hollow handle 12 turn the shafts 38 and 40 for the selective moving of the tape 20 in either direction from top to bottom or bottom to top, between the transparent sheets and across the transparent viewing area 18, by winding or unwinding the tape 20 on the corresponding driven spool 22 or 24, as the case may be. Only the spool on which the tape is to be wound is driven by the respective motor and the other spool truns free.

Each of the reversing switch means 16—16 comprises a pair of pushbutton actuated momentary contact switches 48–50, and 48′–50′, for operating the motors 42 and 44. Since the viewer is reversible, that is to be read from both sides by simply turning the device end-for-end, the pushbutton switches are disposed so that the upper-most button will operate the uppermost scroll spool. Also, since the device as shown is to be held in the user's left hand for scroll indexing by the left hand fingers, each of the pushbutton switches 48 and 48′ is connected in circuit with the motor for the scroll spool which will be uppermost when the device is in use.

Thus, as shown in FIGS. 3, 4 and 5, the switch 48 is connected to operate motor 42 and the switch 50 is connected for operating motor 44 so that the upper one of the user's switch operating fingers will operate the upper spool to move the scroll upwardly and the lower finger will operate the lower spool to move the scroll downwardly.

Conversely, the switch 58' is connected to operate motor 44 and switch 50' is connected to operate motor 42 so that when the indexing viewer is held to be operated by the user's fingers with the spool housing 28 uppermost, the upper finger will operate the upper spool to move the scroll upwardly and the lower finger will operate the lower spool to move the scroll downwardly.

The closing of switch 48 to energize the motor 42 to wind the tape 20 on the spool 22, or closing of the switch 50 to energize the motor 44 to wind the tape 30 of the spool 24, is a mutually exclusive operation. For example, when the motor 42 is energized for moving the tape across viewing area 18, the motor 44 must be de-energized to allow free unwind of the tape 20 from the spool 24. For this reason, the pushbuttons are to be used one-at-a-time and usually for short intervals, the switches being of the normally open type.

Batteries 52 and 54, which are mounted with the handle 12, are series connected to corresponding terminals and switches 48 and 50 for the electrical power of the device. It is understood, however, that an appropriate motor drive could also be operated from a standard 115volt A.C. power source.

The switches 48–48' and 50–50' are cross located, relative to each other, so that when the viewer is held to read from one side panel or the other, switch 48 or 48' will be a top or uppermost switch. In that way, regardless of which end of the viewer is uppermost, the same fingers of the user will operate the device to cause the scroll or tape to move in the same relative direction.

As shown in FIGS. 1 and 4, the end of the body 10, opposite the handle 12, is closed by a snap-on cover 60 which also provides means for journaling the outer ends of the shafts 62 and 64 of the spools 22 and 24, respectively.

Although but one specific embodiment of this invention has been herein shown and described, it will be understood that details of the construction shown may be altered or omitted without departing from the spirit of the invention as defined by the following claims.

I claim:

1. A portable, tape-reading, information-retrieving viewer suitable for being held in the hand of the operator and having relatively inverted opposite side viewing configurations comprising:

a. a main body having first and second spaced ends and spaced generally parallel front and back side panels extending between hollow top and bottom spool housings, b. a top spool rotatably mounted within said top housing and extending substantially from the first to second spaced ends of the main body, c. a bottom spool rotatably mounted wthin said bottom housing and extending substantially from the first to second spaced ends of the main body, d. a scroll wound on and extending between said spools, said scroll being wound on the top spool for winding-up rotation in one direction and on the bottom spool for unwinding rotation in the opposite direction, e. said front and back side panels each comprising a trasparent area extending between the spool housings and substantially from the first to second spaced ends of the main body for passage of the scroll therebetween, f. a hollow handle mounted at the first end of the main body and having front and back sides and top and bottom ends adjacent to the top and bottom spool housings respectively, g. a drive means mounted in the handle and operationally connected to each of said pools for selective winding-up rotation of either of said spools and simultaneous unwinding rotation of the opposite spool, and h. switch control means mounted on each of the front and back sides of the handle, each of said control means being independently operable for electively operating said drive means to turn one or the other of said spools in the same scroll winding direction by use of the same fingers of the same hand of the operator regardless of which side of the viewer is being observed;

whereby the scroll is drawn from top to bottom or bottom to top between said front and back side panels for visual retrieval of information printed on the scroll as seen through the transparent panel areas.

2. A tape-reading, information-retrieving viewer as set forth in claim 1 wherein the drive means comprises:

a. a pair of electric motors each mounted in and adjacent respective top and bottom ends of said hollow handle and each of said motors having an output shaft connected to a respective one of the top and bottom spools for driving the respective spool in a scroll winding direction, and b. an electric power source connected to each of said motors.

3. A tape-reading, information-retrieving viewer as set forth in claim 1 wherein each switch control means comprises a pair of pushbutton-actuated momentary contact switches connected with the drive means so that the upper button actuates the top spool in the scroll winding direction and the lower button actuates the bottom spool in the scroll winding direction regardless of which side of the viewer is being observed by the operator.

4. A tape reading viewer as set forth in claim 2 wherein said switch control means comprises:

a top pushbutton switch mounted on the handle on the back side and toward the top thereof electrically connected between the battery and the adjacent one of said electric motors, b. a bottom pushbutton switch mounted on the handle on the back side and toward the buttom end thereof electrically connected between the battery and the other of said electric motors, c. a top pushbutton switch mounted on the handle on the front side and toward the top end thereof electrically connected between the battery and the said other electric motor, and d. bottom pushbutton switch mounted on the handle on the front side and toward the bottom end thereof electrically connected between the battery and the first mentioned electric motor;

whereby operation of said motors is selectively controlled from either side of said handle.

* * * * *